US00RE35837E

United States Patent [19]

Kosich et al.

[11] E Patent Number: Re. 35,837

[45] Reissued Date of Patent: Jul. 7, 1998

[54] MICROPROCESSOR-CONTROLLED STROBE LIGHT

[75] Inventors: Joseph Kosich, South Toms River; Edward V. Applegate, Toms River, both of N.J.

[73] Assignee: Wheelock Inc., Long Branch, N.J.

[21] Appl. No.: 688,528

[22] Filed: Jul. 30, 1996

Related U.S. Patent Documents

Reissue of:

[64] Patent No.: 5,341,069
Issued: Aug. 23, 1994
Appl. No.: 61,965
Filed: May 14, 1993

[51] Int. Cl.[6] ..... H05B 37/00

[52] U.S. Cl. ..... 315/241 S; 315/241 P; 315/292; 315/294; 315/323; 340/518; 340/628; 340/384.5; 364/141

[58] Field of Search ..... 315/241 S, 241 P, 315/241 R, 292, 294, 323; 340/384.5, 518, 628, 52 F; 358/214; 364/141

[56] References Cited

U.S. PATENT DOCUMENTS

| | | | |
|---|---|---|---|
| 3,784,875 | 1/1974 | Baker et al. | 315/294 |
| 4,029,994 | 6/1977 | Iwans | 315/323 |
| 4,065,767 | 12/1977 | Neuhof et al. | 340/384 E |
| 4,109,246 | 8/1978 | Budrys et al. | 340/518 |
| 4,595,978 | 6/1986 | Sheffield | 364/141 |
| 4,613,797 | 9/1986 | Eggers et al. | 315/241 R |
| 4,623,929 | 11/1986 | Johnson et al. | 358/214 |
| 4,785,280 | 11/1988 | Fubini et al. | 340/52 F |
| 4,935,951 | 6/1990 | Robinson et al. | 379/37 |
| 4,952,906 | 8/1990 | Buyak et al. | 340/331 |
| 5,019,805 | 5/1991 | Curl et al. | 340/628 |
| 5,034,662 | 7/1991 | Nishida et al. | 315/241 P |
| 5,041,767 | 8/1991 | Doroftei et al. | 315/292 |
| 5,128,591 | 7/1992 | Bocan | 315/241 S |

OTHER PUBLICATIONS

David R. Pacholok "Digital To Audio Decoder—for the blind operator", Jan. 7, 1991.

*Primary Examiner*—Robert Pascal
*Assistant Examiner*—Haissa Philogene
*Attorney, Agent, or Firm*—Baker & Botts, L.L.P.

[57] ABSTRACT

A flashtube circuit includes a switch which in a first position regulates the storage over time of energy in a first energy storage device and in a second position allows the transfer of energy from the first energy storage device to a second energy storage device. A microcontroller receives the input voltage and then samples and digitizes it for input into a lookup table. The microcontroller repeatedly cycles the switch between flashes by controlling the time the switch is in its first position. The lookup table output provides the signal for determining the time the switch remains in its first position. The time interval from the last flash controls the time the switch is in its second position. The cycling of the switch is controlled accordingly such that the second energy storage device acquires the predetermined amount of energy for the flash just as the triggering circuit is initiated by the microcontroller. Moreover, the microcontroller controls the switch in a way such that the time the switch is in its first position is maximized and the time the switch is in its second position is generally decreased relative to the time since the last flash. This helps to minimize the peak current drawn by the first energy storage device. In addition, the strobe light circuit is capable of determining if the input voltage is D.C. or is full wave rectified and controls the switch accordingly.

25 Claims, 6 Drawing Sheets

MICROPROCESSOR-CONTROLLED STROBE LIGHT

Matter enclosed in heavy brackets [ ] appears in the original patent but forms no part of this reissue specification; matter printed in italics indicates the additions made by reissue.

BACKGROUND OF THE INVENTION

This invention relates to circuits for electronic strobe lights utilizing microcontrollers and microprocessors. Strobe lights are used to provide visual warning of potential hazards or to draw attention to an event or activity. An important field of use for strobe lights is in electronic fire alarm systems, frequently in association with audible warning devices such as horns, to provide an additional means for alerting those persons who may be in danger. Strobe alarm circuits include a flashtube and a trigger circuit for initiating firing of the flashtube, with energy for the flash typically supplied from a capacitor connected in shunt with the flashtube. In some known systems, the flash occurs when the voltage across the flash unit (i.e., the flashtube and associated trigger circuit) exceeds the threshold value required to actuate the trigger circuit, and in others the flash is triggered by a timing circuit. After the flashtube is triggered it becomes conductive and rapidly drains the stored energy from the shunt capacitor until the voltage across the flashtube has decreased to a value at which the flashtube extinguishes and becomes non-conductive In a more specific sense, the present invention relates to apparatus for charging the energy-storing capacitor in a more precise and efficient manner.

Underwriters Laboratories provides certain specifications that must be met by the alarms for life safety use. For example, the flash rate of the strobe must meet a minimum requirement for the range of voltages for which the flash alarm is to operate.

Supply voltage to strobe alarms, even though typically D.C., often varies in a range of 20 to 31 volts. Changes in voltage due to various conditions such as brown outs can vary the supply voltage applied to the strobe alarm during operation by as much as 4 to 5 volts. In order to ensure that the minimum energy requirements were met, strobe alarms were designed to expend the required energy for the lowest reasonably expected supply voltage. As a consequence, supply voltages greater than the lowest reasonably expected value would (1) unnecessarily expend energy in the flash above the minimum, (2) more often than needed and/or (3) in a manner that was not useful.

For example, the capacitor across the flashtube charges faster in the presence of a higher input voltage. If the flash is actuated sensing the potential across the capacitor, the frequency of the flashes increases in response to the increased input voltage. In addition to wasting energy, the increased frequency also causes unnecessary wear and tear on the capacitor and the flashtube. In another example, where the flash is actuated from a separate timing circuit, a higher input voltage will cause overcharging of the capacitor, or at least make it necessary to provide a larger capacitor than should be necessary. As a result, the potential across the capacitor will cause a larger than necessary flash, thereby wasting energy.

Whether it is the flash frequency or the flash intensity that is increased, energy is being wasted. This is of special concern when the voltage source is a battery supply. Wasted energy translates into a shorter battery life span. Thus, being able to provide precisely sufficient energy per flash at a constant frequency will permit meeting minimum standards of energy output while at the same time minimizing unnecessary expenditure of energy, number of flashes and wear and tear on all components, thus extending the life of the components.

Another problem associated with prior art strobe alarms is the surge in current caused by cycling the switch used to control the storing of the energy for the flash. By storing energy in a small duty cycle (i.e., in one flash cycle, storing energy for a number of short periods of time interspersed with longer periods of inactivity), higher peak currents are required than if longer charging periods with shorter inactive times were used. The commonly used short duty cycles increase the chances of a current overload resulting in the tripping of a circuit breaker or blowing of a fuse, especially when power from one source is supplying more than one alarm, or other devices, such as a control panel. Moreover, current surges, often maximized upon commencing charging immediately after a flash, create problems in practical applications.

In order to overcome the above-described disadvantages and shortcomings of known prior art circuits, an object of the present invention is to provide an improved strobe light circuit wherein the energy expended by the flash has decreased fluctuation, is less dependent on the supply voltage, if at all, and does not vary substantially the flash rate or the flash intensity.

Another object of the invention is to provide a strobe light circuit which provides with few components a constant flash rate and intensity.

A further object is to provide a strobe light circuit which has a higher operating efficiency than prior art circuits by avoiding unnecessary energy losses through precision charging of the energy storage element in shunt with the flashtube.

A further object is to provide a strobe light circuit utilizing lower peak charging currents in order to minimize surges and possible tripping of circuit breakers or blowing of fuses.

A still further object is to provide a strobe light circuit that can be driven by either a D.C. voltage input or a full wave rectified voltage input.

SUMMARY OF THE INVENTION

The strobe light circuit in accordance with the invention is powered by an input voltage that may vary. The circuit is used to flash a flashtube at a predetermined flash rate with a predetermined amount of energy in each flash, notwithstanding the variation of the input voltage. The circuit includes a first energy storage device, such as an inductor, supplied from the input voltage. Also, there is a second energy storage device, such as a capacitor, connected in shunt with the flashtube. This second device for storing energy is capable of storing energy at a rate faster than the first energy storage device. A switch, such as a transistor, regulates the storage over time of energy in the first energy storage device and allows the transfer of energy from the first energy storage device to the second energy storage device. The switch has a first position and a second position such that when the switch is in the first position, energy is stored in the first energy storage device and when the switch is in the second position, energy from the first energy storage device is transferred to the second energy storage device. A relative peak current drawn by the first energy storage device is attained just as the switch changes from its first position to its second position.

A device such as a diode permits current flow from the first energy storage device to the second energy storage device and blocks current flow from the second energy storage device to either the first energy storage device or the switch. A triggering circuit is used to flash the flashtube at the predetermined flash rate.

A microcontroller, powered by a regulated voltage supply, initiates the triggering circuit at the predetermined flash rate. A regulator is used to convert the input voltage into the regulated voltage supply. The microcontroller also receives the input voltage and then samples and digitizes it into a lookup table input having a corresponding D.C. lookup table output. The lookup table is either software or part of the firmware of the microcontroller. The microcontroller repeatedly cycles the switch between flashes of the flashtube by controlling the time the switch is in its first position. The lookup table output provides the signal for determining the time the switch remains in its first position. The time interval from the last flash of the flashtube controls the time the switch is in its second position.

Overall, the cycling of the switch is controlled such that the second energy storage device acquires the predetermined amount of energy for the flash of the flashtube just as the triggering circuit is initiated by the microcontroller. Moreover, the microcontroller controls the switch in a way such that the time the switch is in its first position is maximized and the time the switch is in its second position is generally decreased relative to the time since the last flash of the flashtube. This helps to minimize the peak current drawn by the first energy storage device.

In addition, the strobe light circuit according to the invention is capable of determining if the input voltage is D.C. or is full wave rectified. The microcontroller after digitizing the input voltage uses a second lookup table, in this case an internal full wave rectified lookup table, for providing a different output corresponding to the lookup table input when the input voltage is determined to be full wave rectified. Thus, the time the switch is in its first position is controlled by the full wave rectified lookup output instead of the D.C. lookup table output. The microcontroller varies the full wave rectified lookup table output only if the input voltage sampled and digitized is greater than the previous input voltage sampled and digitized. The microcontroller samples and digitizes the input voltage at a frequency equal to the frequency in which the switch cycles, utilizing the previous full wave rectified lookup table output to control the switch until the next input voltage is sampled and digitized.

Other objects, features and advantages of the invention will become apparent, and its construction and operation better understood, from the following detailed description of the currently preferred embodiment, read in conjunction with the accompanying drawings.

DETAILED DESCRIPTION OF THE PREFERRED EMBODIMENT

Figure 1:
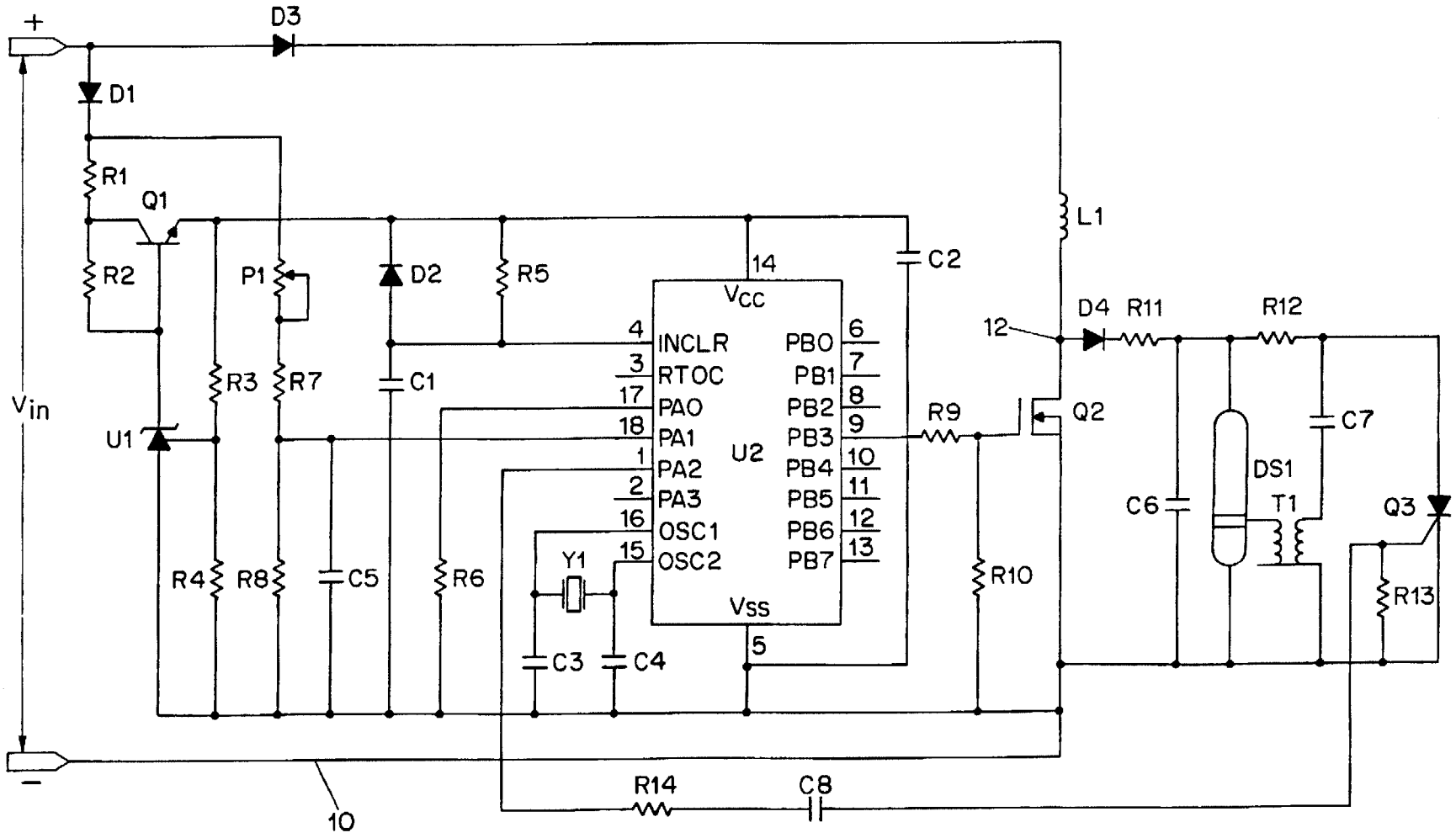
FIG. 1 is a circuit diagram showing in detail a preferred embodiment of the strobe circuit according to the invention.
Figure 2:
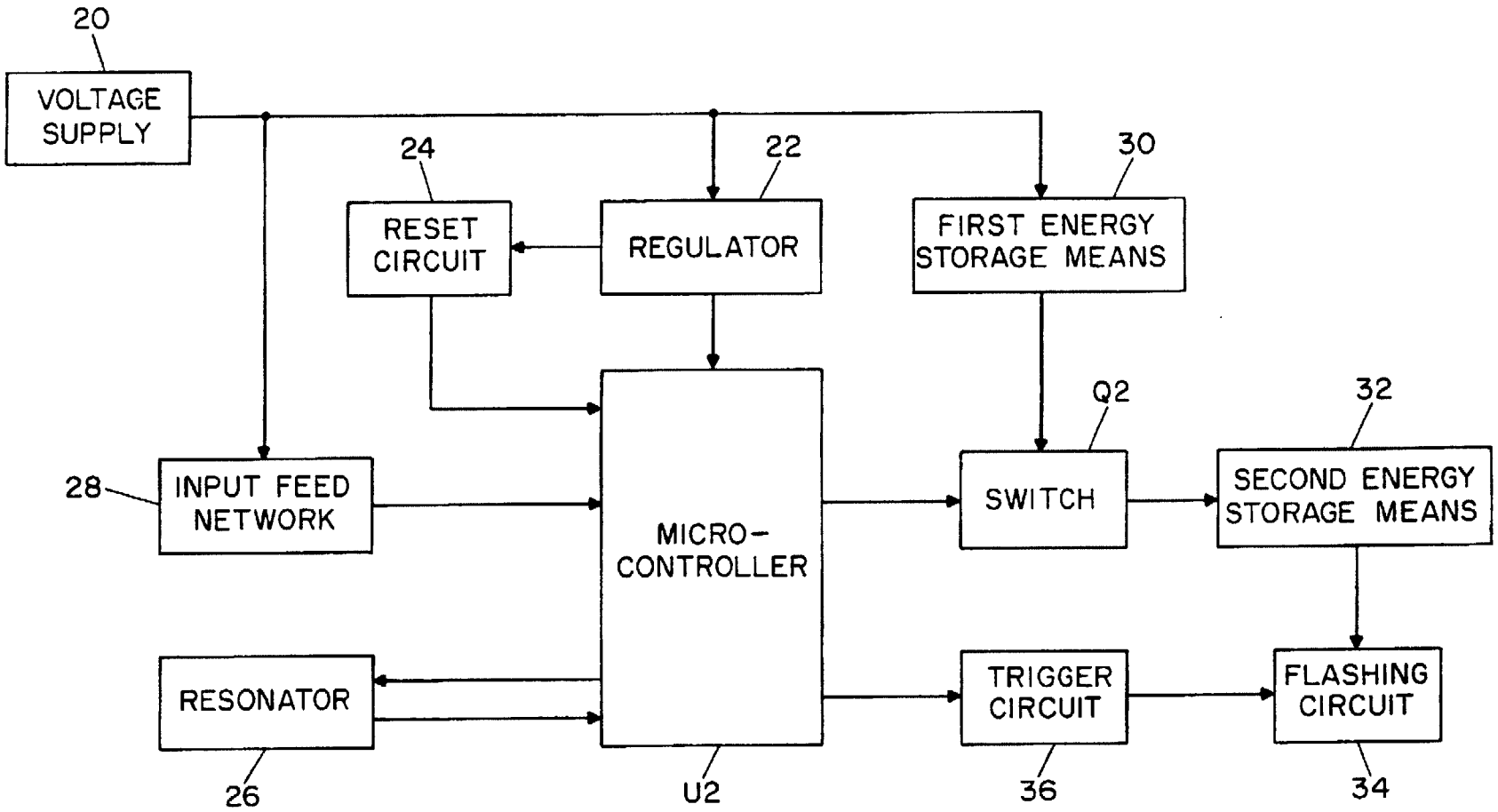
FIG. 2 is a block diagram of the circuit shown in FIG. 1.

Referring to the electric circuit diagram of FIG. 1 and the block diagram of FIG. 2, a first embodiment of the invention is connected across a D.C. voltage source 20, not shown in FIG. 1, which supplies a voltage $V_{in}$. The supply voltage $V_{in}$ may have a wide range of values, from 20 volts to 31 volts, for example. The voltage is applied through a diode D1, which typically has a voltage drop of 0.7 volt, to a regulator 22 which includes resistors R1, R2, R3 and R4, switch Q1 and integrated circuit U1 in order to provide regulated 5.00±1% volt supply to the $V_{cc}$ input of microcontroller U2. A precise $V_{cc}$ input voltage is vital for the analog to digital reference input of microcontroller U2. Resistor R1 is connected at one end to diode D1 and at the other end to both resistor R2 and the collector of switch Q1, which in this instance is a transistor. The other end of resistor R2 is connected to the base of switch Q1 and integrated circuit U1, which acts as a controlled Zener for providing a precise 5.00±1% voltage supply. Resistor R3 is connected between the emitter of switch Q1 and the control pin of integrated circuit U1. Resistor R4 is connected at one end to both resistor R3 and the control pin of integrated circuit U1- and at the other end to one end of integrated circuit U1, which is at the negative node 10 of the voltage source. Resistors R3 and R4 are of equal value for biasing integrated circuit U1.

A reset circuit 24 includes diode D2, resistor R5 and capacitor C1. Diode D2 and resistor R5 are connected to each other in parallel, and at one end to the emitter of switch Q1 and at the other end to both capacitor C5 and the clear input to microcontroller U2. The other end of capacitor C5 is connected to the negative node 10 of the voltage source.

As stated above, microcontroller U2 is supplied with a regulated 5 volt supply at $V_{cc}$. $V_{ss}$ connected to the negative node 10. Capacitor C2 is connected across $V_{cc}$ and $V_{ss}$ and acts as a filter. Resistor R6, acting as a shield, is connected between an input of microcontroller U2 and negative node 10.

The resonator circuit 26 consists of oscillator Y1, capacitor C3 and capacitor C4. Oscillator Y1 provides 4 MHz oscillation to the microcontroller U2 and is connected across the two oscillator inputs of the microcontroller U2. Capacitor C3 is connected between the first oscillator input and the negative node 10. Capacitor C4 is connected between the second oscillator input and the negative node 10.

An analog to digital input feed network 28 is used to provide microcontroller U2 with a voltage level proportional to $V_{in}$. The network includes resistor R7, resistor R8, potentiometer P1 and capacitor C5. Resistors R7 and R8 and potentiometer P1 form a voltage divider. Potentiometer P1, used for fine tuning the voltage divider, is connected at one end at the common node between diode D1 and resistor R1. The other end of potentiometer P1 is connected to resistor R7, which in turn is connected to resistor R8 and the analog to digital input of microcontroller U2. The other end of resistor R8 is connected to negative node 10. Capacitor C5 is connected in parallel across resistor R8 and functions as a filter.

Prior to describing in detail the function of microcontroller U2, the components affected by microcontroller U2 will be described. Across $V_{in}$ is a branch with diode D3, inductor L1 and switch Q2. Diode D3 is connected between $V_{in}$ and inductor L1 and has approximately a 0.7 voltage drop across it. Inductor L1 is a fast energy storage device 30 for transfer of energy to the triggering circuit. Inductor L1 is connected between diode D3 and switch Q2. The other end of switch Q2 is connected to negative node 10. Switch Q2 in this embodiment is a MOSFET transistor which cycles between a conducting state (i.e., position) and a nonconducting state and is controlled by an output of microcontroller U2. A voltage divider including resistor R9 and resistor R10 connects the output of microcontroller U2 to the gate of switch Q2. One end of resistor R9 is connected to the output of microcontroller U2 and one end of resistor R10 is connected to negative node 10. When switch Q2 is closed, node 12, between inductor L1 and switch Q2, is pulled to the same potential of negative node 10. In other words, inductor L1 is across $V_{in}$ and the flashing circuit through diode D4 is isolated. With switch Q2 closed, inductor L1 stores energy until it reaches its steady state level or until switch Q2 is opened. When switch Q2 is opened, the energy stored in inductor L1 is at least partially transferred through diode D4 and resistor R11 to charging capacitor C6, the second energy storage device 32. By controlling the opening and closing of switch Q2, the rate of storing energy in inductor L1 is regulated, thereby regulating the storage of energy across charging capacitor C6.

The flashing circuit 34 includes diode D4, resistor R11, charging capacitor C6 and flashtube DS1. Charging capacitor C6 and flashtube DS1 are connected in parallel, one end of the two components being connected to negative node 10. Diode D4 and resistor R11 are connected in series, one end of diode D4 being connected between inductor L1 and switch Q2. Diode D4 permits current flow into the flashing circuit but prevents discharge of charging capacitor C6 when the potential across it is higher than $V_{in}$ or the potential across inductor L1. One end of R11 is connected to the other end of the parallel combination of charging capacitor C6 and flashtube DS1.

The triggering circuit 36 includes triggering transformer T1, resistor R12, capacitor C7, SCR Q3, resistor R13, capacitor C8 and resistor R14. Output PA2 of microcontroller U2, at the appropriate time, signals SCR Q3, triggering transformer T1 to pulse flashtube DS1. Resistor R14 provides over voltage and current protection to output PA2. Capacitor C8 and resistor R13 ensure that only the leading edge of the PA2 pulse reaches the gate of SCR Q3, which only requires a small pulse. Resistor R13 helps isolate SCR Q3 from noise. The potential across capacitor C7 slowly reaches the potential across charging capacitor C6. The rate of potential increase across C7 is dictated by resistor R12. When SCR Q3 is fired, capacitor C3 is in effect across the primary of trigger transformer T1, causing a 4000 volt potential across the secondary of trigger transformer T1, thus ionizing the gas in flashtube DS1, causing the flash. Resistor R12 also prevents SCR Q3 from shorting charging capacitor C6.

Figure 3A:
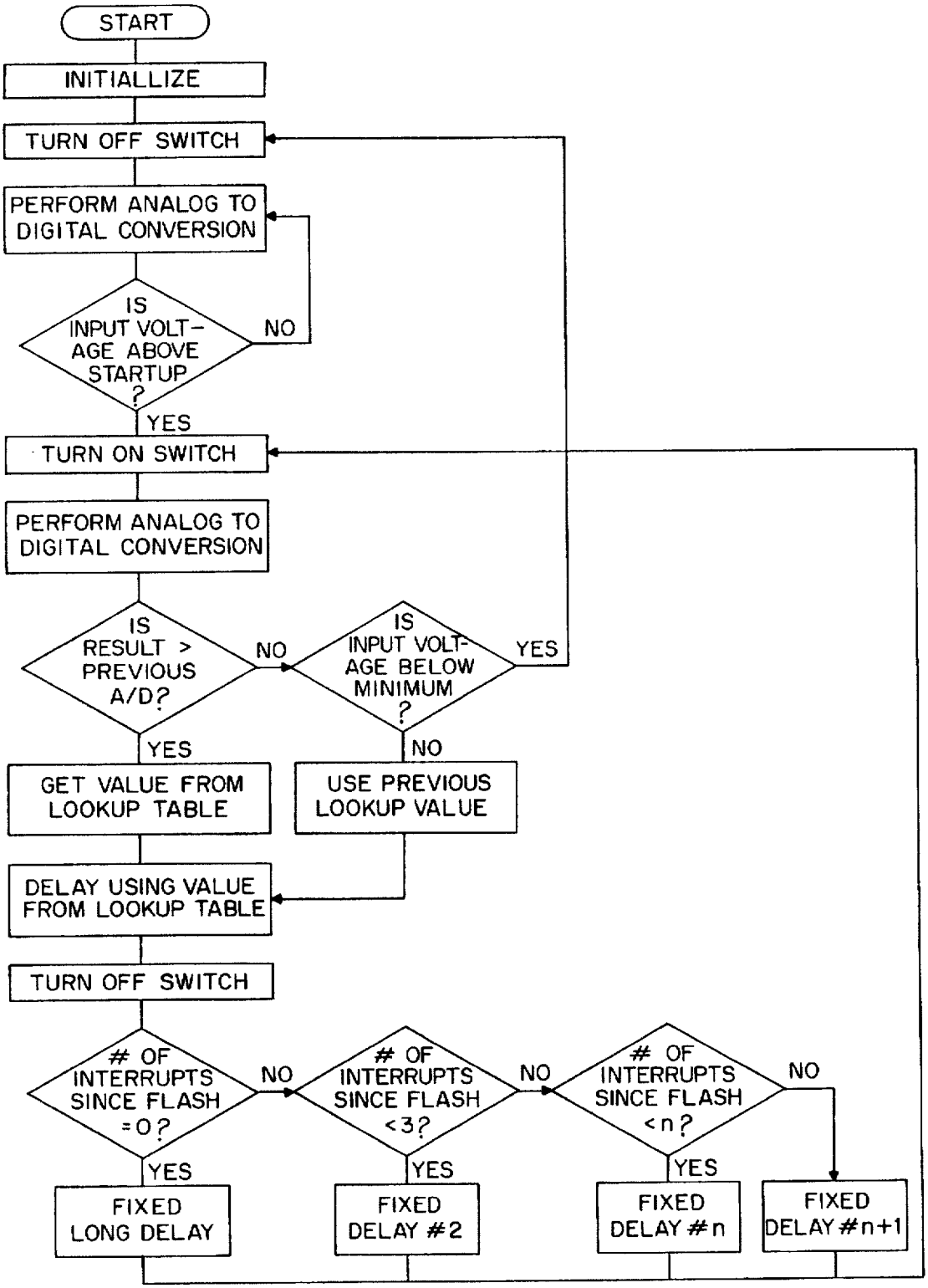
FIG. 3(a) is a flow chart of the functions of the microcontroller in the first preferred embodiment.
Figure 3B:
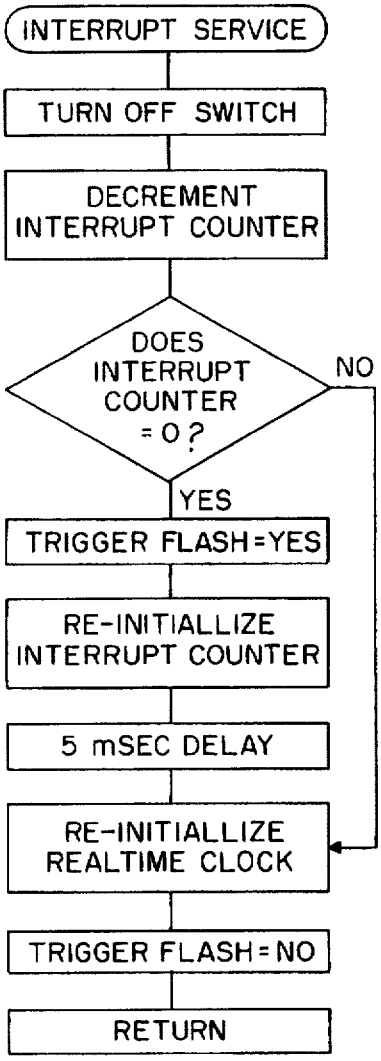
FIG. 3(b) is a flow chart of the interrupt function of the microcontroller in the first preferred embodiment.

Basically, microcontroller U2 uses an internal analog to digital converter to arrive at a digital equivalent of the supply voltage. Microcontroller U2 then uses this digitized information to control the opening and shutting of switch Q2. As a result, the charging of inductor L1, charging capacitor C6 and capacitor C7 is controlled by microcontroller U2 so that the desired potential across the charging capacitor C6 and flashtube DS1 is achieved just in time for microcontroller U2 to signal trigger transformer T1, via output PA2, to trigger flashtube DS1. The functions of microcontroller U2 are illustrated by the flow charts of FIGS. 3(a) and 3(b).

Figure 4A:
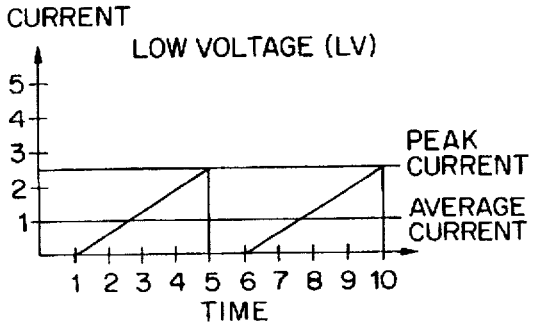
FIG. 4a (PRIOR ART)
FIG. 4(a) is an Illustration of the average peak current of a prior art circuit (low voltage)
Figure 4B:
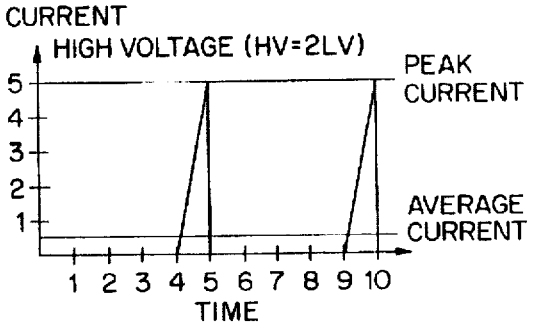
FIG. 4b (PRIOR ART)
FIG. 4(b) is an illustration of the average peak current of a prior art circuit (high voltage)
Figure 4C:
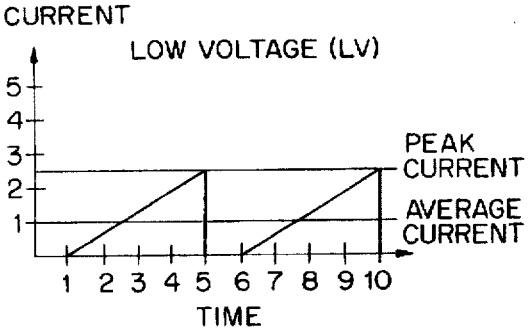
FIG. 4(c) is an illustration of the average peak current of the preferred embodiment (low voltage)
Figure 4D:
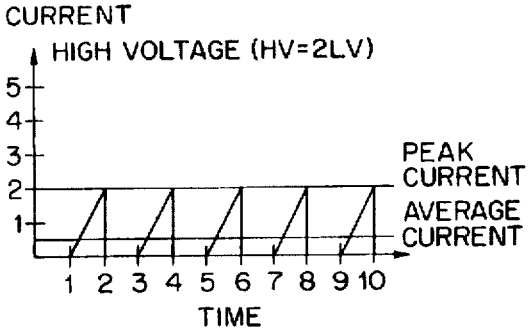
FIG. 4(d) is an illustration of the average peak current of the preferred embodiment (high voltage)

In this preferred embodiment, microcontroller U2 is a PIC16C71 microcontroller, having an eight bit resolution, built-in analog to digital converter. The supply voltage is measured by the analog to digital converter in approximately ¼ volt steps to a total of 256 steps. The program of the microcontroller U2 equates each step with a location in a look up table. One conversion or measurement is made for each cycle of the switch Q2. Each time a measurement is made, a new value is read from the look up table. These values control the ON time of switch Q2. The ON time for each value in the look up table is empirically derived with testing equipment prior to manufacturing. For low voltages, the ON time is long. For high voltages, the ON time is short, the charging of inductor L1 being the limiting factor. Thus, the energy stored throughout a flash cycle is kept somewhat constant The switching frequency of switch Q2 has a range of approximately 3 khz to 30 khz and has a high duty cycle (roughly 50% to 90%). Each value in the look up table equates to a switching frequency for ensuring that switch Q2 will be ON for sufficient time to charge charging capacitor C6, and thus flashtube DS1, to the precise amount needed for the minimum required intensity of the once per second flash. The high duty cycle results in storing of the energy in inductor L1 for most of the one second interval between flashes. This means that peak currents are lower than if the routine utilized a low duty cycle in which inductor L1 was charged for a relatively shorter period during each flash cycle. This is illustrated by comparing FIGS. 4(a) and 4(b), depicting the prior art, and FIGS. 4(c) and 4(d), depicting the present invention's cycling frequency. The low voltage (LV) graphs of FIGS. 4(a) and 4(c) are similar with average currents of 1 unit and peak currents of 2.5 units. The high voltage (HV) graph in FIG. 4(b) shows a peak current of 5 units with an average current of 0.5 units. However, the high voltage (HV) graph in FIG. 4(d) shows a peak current of 2 units while maintaining an average current of 0.5 units. The ON time in both figures is dictated by the input voltage.

If the supply voltage sensed is below a minimum (e.g., less than 13 volts below which the precision 5.00±1% input might be lost), microcontroller U2 turns OFF switch Q2 and waits for the level to rise above the preset start up voltage (e.g., 14 volts).

Microcontroller U2 has an interrupt, a real time clock and a prescaler which are used to produce an accurate, one second flash rate. The real time clock and prescaler generate a one-fifteenth of a second interrupt. The interrupt service routine then counts these pulses. When fifteen pulses have occurred, a pulse is sent to the SCR Q3 and flashtube Q3 is triggered.

Figure 4E:
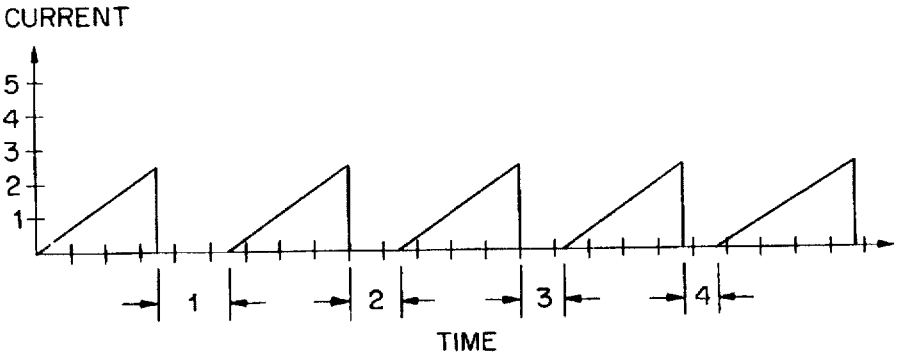
FIG. 4(e) is an illustration of the average peak current of the preferred embodiment showing a change in OFF time.

In addition, the interrupt routine also controls the variable OFF time function. The OFF time of switch Q2 is programmed to be a different predetermined value dependent on the number of cycles completed in the fifteen hertz rate of the interrupt (i.e., dependent on the time since the last flash). A high value of OFF time is used after a trigger event, followed by several progressively lower values. For example the OFF time is longest during the first 1/15 second period after a flash. The OFF time is lowered for a 2/15 second period, lowered again for another 2/15 second period, lowered a third time for a 2/15 second period, then remains at its lowest value for the remaining 8/15 second period, until the next flash. This helps to minimize current anomalies during and immediately after a flash. FIG. 4(e) illustrates a change in the OFF time interval between periods. Note that each of the five cycles shown in FIG. 4(e) represents multiple cycles (e.g. at a frequency of 10 Khz, 667 cycles may be represented by the first cycle).

By way of example, the following parameters may be used for the elements of the FIG. 1 circuit to obtain a flash frequency of one flash per second:

| ELEMENT | Value or No. |
|---|---|
| C1 | CAP., .47 μF |
| C2 | CAP., 15 μF. 16 V |
| C3, C4 | CAP., 33 pF. 200 V |
| C5 | CAP., 1 μF. 50 V |
| C6 | CAP., 180 μF. 250 V |
| C7 | CAP., .047 μF. 400 V |
| C8 | CAP., .01 μF. 50 V |
| D1, D3 | DIODE, 1N4007 |
| D2 | DIODE, 1N914 |
| D4 | DIODE, HER106 |
| L1 | INDUCTOR, 1.4 mH |
| Q1 | TRANSISTOR, 2N5550 |
| Q2 | TRANSISTOR, IRF740 |
| Q3 | SCR, EC103D |
| R1 | RES., 330, ¼W, 5% |
| R2 | RES., 4.7K. ¼W, 5% |
| R3, R4 | RES., 10K. ¼W, .1% |
| R5 | RES., 39K. ¼W, 5% |
| R6 | RES., 100, ¼W, 5% |
| R7 | RES., 11.8K. ¼W, .1% |
| R8 | RES., 1K. ¼W, .1% |
| R9, R14 | RES., 220, ¼W, 5% |
| R10 | RES., 100K. ¼W, 5% |
| R11 | RES., 22, ½W, 5% |
| R12 | RES., 220K. ¼W, 5% |
| R13 | RES., 10K. ¼W, 5% |
| T1 | TRANSFORMER, TRIGGER COIL |
| U1 | I.C., TL431ACLP |
| U2 | I.C., PICI6C71 |
| Y1 | CERAMIC RES 4 MHz |
| P1 | POT., 5K. OHMS |

Figure 5B:
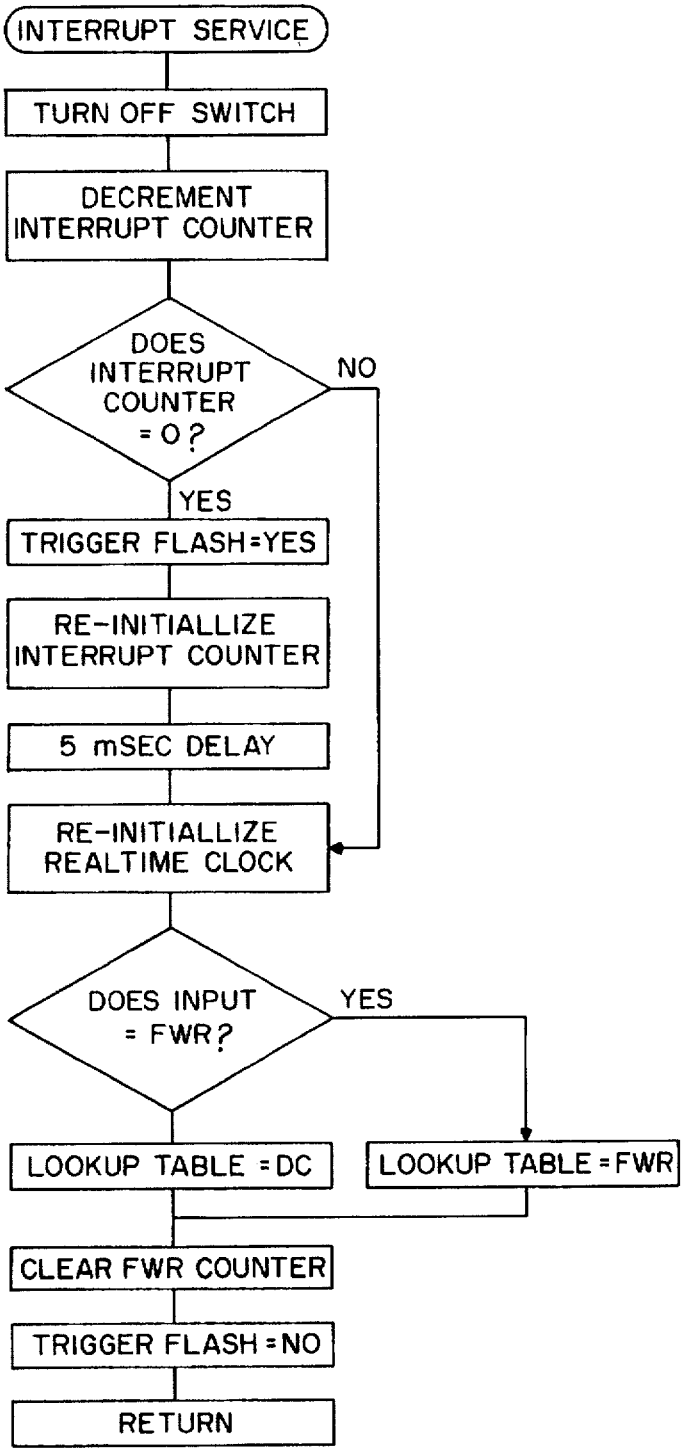
FIG. 5(b) is a flow chart of the interrupt function of the microcontroller capable of being driven by full wave rectified input.
Figure 5A:
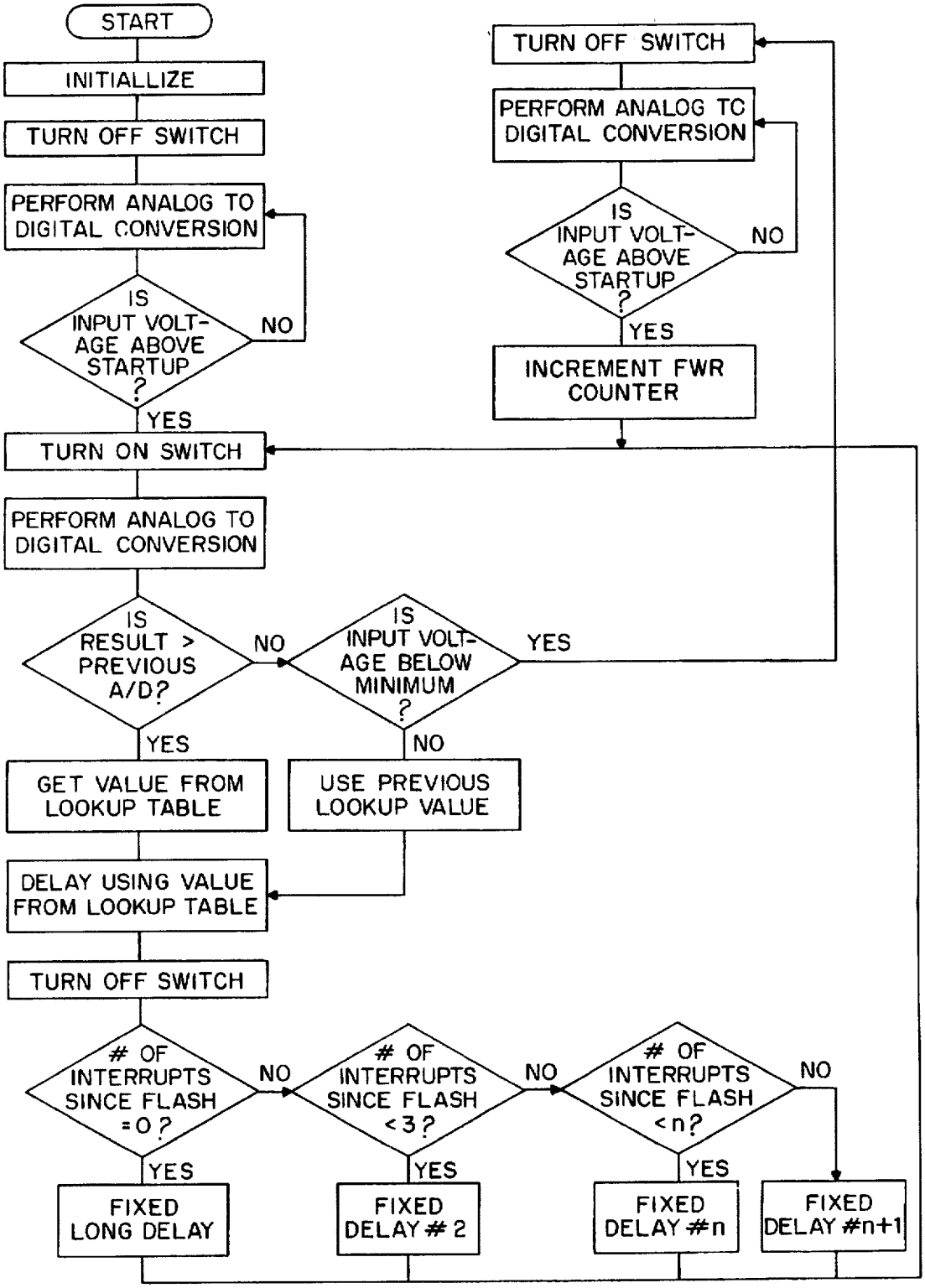
FIG. 5(a) is a flow chart of the functions of the microcontroller capable of being driven by full wave rectified input.

A second preferred embodiment of the invention uses the electric circuit shown in FIG. 1. However, this embodiment is capable of operating on unregulated full wave-rectified D.C. supply voltage, in addition to a D.C. supply voltage. FIGS. 5(a) and 5(b) are flow charts illustrating this embodiment. Microcontroller U2 utilizes a second internal look up table. The program distinguishes between full wave rectified D.C. and "clean" (i.e., filtered) D.C. by detecting the valleys in the full wave rectified signal. Valleys are detected, counted, and compared to a programmed value. The program then determines which look up table to use, D.C. or full wave rectified.

If the present measurement of the supply voltage is less than the previous measurement, a drop out test is performed instead of the look up. This feature ensures that peaks rather than valleys of the full wave rectified signal are used for the look up table.

The interrupt routine discussed above is also responsible for resetting the peak hold characteristic of the analog to digital converter program. The peak hold characteristic holds constant the input to the look up table for 1/15 of a second to accommodate full wave rectified input to the look up table once digitized.

By way of summary, because the present circuit coordinates the charging of the energy used to flash the flashtube so that the predetermined amount of energy is attained just prior to the signal to flash the flashtube, at its constant flash rate, and because the inductor is charged for as long an amount of time as is possible between the flashes, a constant flash rate with a constant flash intensity is obtained while at the same time minimizing the peak current drawn by the inductor.

While preferred embodiments have been shown and described, various modifications and substitutions may be made thereto without departing from the spirit and scope of the invention. Accordingly, it is to be understood that the foregoing description of the present invention is by way of illustration and not limitation.

[I] *We* claim:

1. A strobe light circuit powered by an input voltage, for flashing a flashtube at a predetermined flash rate with a predetermined amount of energy in each flash, comprising:

first means for storing energy supplied from said input voltage;

second means for storing energy, connected in shunt with said flashtube and capable of storing energy at a rate faster than said first storing means;

switching means for regulating the storage over time of energy in said first storing means and for allowing transfer of energy from said first storing means to said second storing means, said switching means having a first position and a second position such that when said switching means is in said first position, energy is stored in said first storing means and when said switching means is in said second position, energy from said first storing means is transferred to said second storing means, and such that a relative peak current drawn by said first storing means is attained as said switching means switches from said first position to said second position;

means for permitting current flow from said first storing means to said second storing means and for blocking current flow from said second storing means to said first storing means or said switching means;

means for triggering said flashtube at said predetermined flash rate;

means for regulating said input voltage into a regulated voltage supply; and microcontroller means powered by said regulated voltage power supply, for initiating said triggering means at the predetermined flash rate[, for receiving said input voltage, for sampling and digitizing said input voltage into a lookup table having a corresponding D.C. lookup table output,] and for repeatedly cycling said switching means between flashes of said flashtube by controlling the time said switching means is in said first position [in accordance with the lookup table output,] and controlling the time said switching means is in said second position [in accordance with the time expended since the last flash of said flashtube], such that said second energy storing means acquires said predetermined amount of energy as the triggering means is initiated by the microcontroller means and such that the time said switching means is in said first position is maximized [and the time said switching means is in said second position is generally decreased relative to the time since the last flash of said flashtube,] to minimize the peak current drawn by the first storing means.

2. The strobe light circuit according to claim 1, wherein said microcontroller means is capable of sampling and digitizing said input voltage [each time said switching means cycles] *to derive a digitized input voltage measurement corresponding to one of a plurality of predetermined timing values stored in at least one lookup table, which timing values determine the length of time said switching means is in said first position, and said microprocessor means utilizes said corresponding one of said timing values from said lookup table to control the length of time said switching means is in said first position.*

3. The strobe light circuit according to claim 2, wherein the microcontroller means segregates the time between said flashes into a plurality of periods, such that said microcontroller means controls the time during each cycle of the switching means in which said switching means is in said second position to be substantially the same throughout the same period.

4. The strobe light circuit according to clam 3, wherein the time during each cycle of the switching means in which said switching means is in said second position is decreased in subsequent periods.

5. The strobe light circuit according to claim 4, wherein said switching means cycles in a range substantially between 3 khz and 30 khz.

6. The strobe light circuit according to claim [5] *1*, wherein said flash rate is substantially one flash per second.

7. The strobe light circuit according to claim 6, wherein said input voltage is in a range substantially between 20 volts and 31 volts D.C.

8. The strobe light circuit according to claim 4, wherein said periods are substantially multiples of a fraction of the flash rate.

9. The strobe light circuit according to claim 8, wherein said fraction is one-fifteenth.

10. The strobe light cut according to claim 4, further comprising an input feed network for reducing the input voltage to the microcontroller means.

11. The strobe light circuit according to claim 10, wherein said input feed network includes a potentiometer for finely controlling the reduction of said input voltage.

12. The strobe light circuit according to claim 4, wherein the switching means is a field effect transistor.

13. The strobe light circuit according to claim 12, wherein the means for permitting and blocking current low is a diode.

14. The strobe light circuit according to claim 13, wherein the first energy storing means is an inductor.

15. The strobe light circuit according to claim 14, wherein the second energy storing means is a capacitor.

16. The strobe light circuit according to claim [1] *2*, wherein said microcontroller *means* is capable of determining if said input voltage is D.C. or full wave rectified.

17. The strobe light circuit according to claim 16, wherein said microcontroller [after digitizing said input voltage has] *means includes a D.C. lookup table and* a full wave rectified lookup table [output corresponding to said lookup table input when said voltage is determined to be full wave rectified], *each of said D.C. and full wave rectified lookup tables storing a plurality of said predetermined timing values,* for controlling the time said switching means is in said first position [instead of said switching means being controlled by said D.C. lookup table] *in accordance with whether said input voltage is determined to be D.C. or full wave rectified, respectively.*

18. The strobe light circuit according to claim 17, wherein said microcontroller means [varies] *utilizes a different predetermined timing value stored in* said full wave rectified lookup table [output] only if said *digitized* input voltage [sampled and digitized] *measurement* is greater than the previous *digitized* input voltage [sampled and digitized] *measurement* .

19. The strobe light circuit according to claim 18, wherein said microcontroller means samples and digitizes said input voltage at a frequency less than the frequency in which said switching means cycles, utilizing the previous *predetermined timing value from the* full wave rectified lookup table [output] to control the switching means until the next *digitized* input voltage *measurement* is [sampled and digitized]*made*.

20. The strobe light circuit according to claim 19, wherein said microcontroller means samples and digitizes said input voltage at a frequency approximately one order of magnitude greater than the frequency of said flash rate.

21. The strobe light circuit according to claim 20, wherein the microcontroller means segregates the time between said flashes into a plurality of periods, such that said microcontroller means controls the time during each cycle of the switching means in which said switching means is in said second position to be substantially the same throughout the same period.

22. The strobe light circuit according to claim 21, wherein the time during each cycle of the switching means in which said switching means is in said second position is decreased in subsequent period.

23. The strobe light circuit according to claim 22, wherein said switching means cycles in a range substantially between 3 khz and 30 khz.

24. The strobe light circuit according to claim 23, wherein said periods are substantially multiples of a fraction of the flash rate.

25. The strobe light circuit according to claim 24, wherein said input voltage is sampled and digitized at a frequency which is substantially a multiple of said fraction.

* * * * *